United States Patent [19]

Sgroi et al.

[11] Patent Number: 4,515,149

[45] Date of Patent: May 7, 1985

[54] APPARATUS FOR THE COLLECTION OF SOLAR HEAT ENERGY AND A SOLAR COLLECTOR

[76] Inventors: Carl M. Sgroi, 609 Monroe Blvd., Long Beach, N.Y. 11561; Klaus M. Hubner, 22 Claurome Pl., Freeport, N.Y. 11520

[21] Appl. No.: 548,696

[22] Filed: Nov. 4, 1983

[51] Int. Cl.³ .............................................. F24J 3/02
[52] U.S. Cl. .................... 126/442; 126/417; 126/443; 126/450; 126/444; 165/177; 165/178
[58] Field of Search .............. 126/443, 442, 438, 417, 126/444, 446, 450; 165/177, 178, 154, 138, 109 T, 164, 81

[56] References Cited

U.S. PATENT DOCUMENTS

| | | | |
|---|---|---|---|
| 4,220,136 | 9/1980 | Penney | 126/438 |
| 4,222,372 | 9/1980 | Bogatzki | 126/443 |
| 4,340,035 | 7/1982 | Begun | 126/443 |
| 4,392,526 | 7/1983 | Hage et al. | 165/154 |
| 4,397,304 | 8/1983 | Villain | 126/443 |
| 4,421,104 | 12/1983 | Adcock | 126/446 |
| 4,423,718 | 1/1984 | Garrison | 126/443 |

FOREIGN PATENT DOCUMENTS 618465 4/1961 Canada ............................ 165/177

Primary Examiner—Samuel Scott
Assistant Examiner—Helen Ann Odar
Attorney, Agent, or Firm—Bauer & Amer

[57] ABSTRACT

An apparatus for the collection of solar heat energy and a solar collector for use therewith in which a fluid media is conducted to flow in heat exchange relation with a heat absorber that can be selectively activated and deactivated for use without disassembly of the apparatus and in which the heat absorber is enclosed within a heat exchanger having a plurality of chambers at least one of which is in the path of the direct rays of the sun, but which permits an exchange and equalization of temperatures in all of the chambers while the whole is enclosed in an outer housing.

17 Claims, 3 Drawing Figures

APPARATUS FOR THE COLLECTION OF SOLAR HEAT ENERGY AND A SOLAR COLLECTOR

BACKGROUND OF THE INVENTION

The present invention relates to the construction of solar collectors and in particular to a solar collector having a central core through which fluid flows to be heated by the rays of the sun.

Early solar collectors were known to employ a reflecting wall, generally curved to gather and force sunlight onto a central conduit through which a fluid media passes. The collectors are quite long and wide while the central conduit, or fluid core, is generally very small so that much sunlight can be concentrated on a very small quantity of fluid media in the hope of transferring a maximum amount of energy to the flowing media. Such collectors, however, did not optimize energy transfer; were too large for economical production or installation; and, above all, failed to allow for sufficiently high flow rates desired in most applications.

Various attempts were made to improve the design, i.e., parameters of curvature and size, of the reflecting wall as well as in the shape and cross-sections of the central core. For example, in SCHOOK, U.S. Pat. No. 4,285,330, the central core was formed of a pair of concentric cylindrical tubes, the outer tube of which was provided with a plurality of spaced parallel dark strips running lengthwise on the surface of the tube. This construction was not wholly optimal in its design since the light passing between the dark strips had to penetrate both walls of the core, and each had a tendency, because of their cylindrical shape, to reflect the light rather than to absorb its energy.

In U.S. Pat. No. 4,281,641 DeVORE, a core was constructed of a pair of coaxially arranged triangular tubes in which a plurality of fluid conducting conduits were arranged, and on which were attached one or more curved fins for absorbing the sun's energy. The sun's rays had to penetrate a double reflective wall and also had to be absorbed by the fins before being conducted to the fluid conduits.

In U.S. Pat. No. 4,340,035 BEGUN, a core is formed of an outer portion comprising a transparent triangular tube in which is located an inner core member formed as a solid elongated body preferable of metal, having a small axial through conduit for passage of the fluid media and three equally spaced radial projections. The radial projections contact, along their active lengths, the inner edges of the triangular tube so that only separated elongated channels are formed. The inner core body is coated with an absorbing layer, black in nature, so that the sun's light energy is more easily absorbed. On the contrary, however, the rather substantial inner solid core body requires much time to conduct the heat to the fluid media; media flow rate is rather small due to the small diameter of its conduit; thermal flow between the inner and outer core is severely inhibited; and, the cost of manufacture increased by the need to provide an elongated central core body.

Another disadvantage inherent in all of the above collectors is the fact that these units could not be provided in modular form, so that they might be connected in series, to provide ganged collectors of varying desired lengths. As a result, collectors were required to be customized for the space where they would be located. This again contributes to an increase in cost, not generally warranted by the efficiency or productivity of the resultant assembly.

It is the primary object of the present invention to provide a solar collector which provides a more optimal transfer of the sun's energy to a fluid media than those known heretofore, taking into account its simplicity of construction, its use of inexpensive materials and parts and its increased fluid flow rates.

These objects, together with other objects and advantages will be enumerated in detail, as well as be otherwise obvious from the foregoing disclosure of the details of the present invention.

SUMMARY OF THE INVENTION

According to the present invention, a solar collector is formed with a curved reflector and a heat collector arranged along the line of focus of the sun's rays. The heat collector is formed of an outer tubular support having a generally triangular polygonal cross-section in which is located an inner tubular core absorber having a polygonal cross-section different from that of the outer tubular support. The inner absorber is removably mounted within the outer tubular support by a plurality of clips which hold the absorber along its corner edges insulatingly spaced from the tubular support so that a gap is created, allowing the flow of air or other fluid media circularly about the core absorber within the tubular support.

Preferably, the outer tubular support is triangular and the inner core absorber is in the shape of a three cusped hypocycloid. Attachment of the collector, by conventional duct means, fitted to the ends of the tubular support and the inner absorber, within a heating system can be easily effected.

The curved reflector may be a part of a housing assembly including also a front arcuate transparent panel of similar cross-section and sealed along the longitudinal edges with the reflector. Side walls, sealed at both the front panel and the reflector, enclose the housing. The side walls are provided with openings aligned with the outer tubular support. It is also preferred that the tubular support be secured fluid-tight at its ends to the side walls of the housing, as by glue, heat welding or otherwise.

Full details of the present invention are set forth in the following description of the preferred embodiment and in the accompanying drawings.

BRIEF DESCRIPTION OF THE DRAWINGS

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein.

DESCRIPTION OF THE INVENTION

Figure 2:
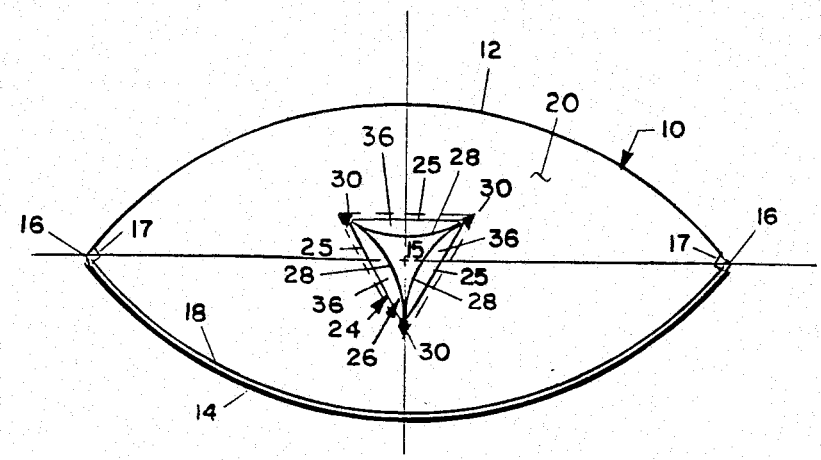
FIG. 2 is a cross-sectional view of the solar collector taken along lines 2—2 of FIG. 1.
Figure 1:
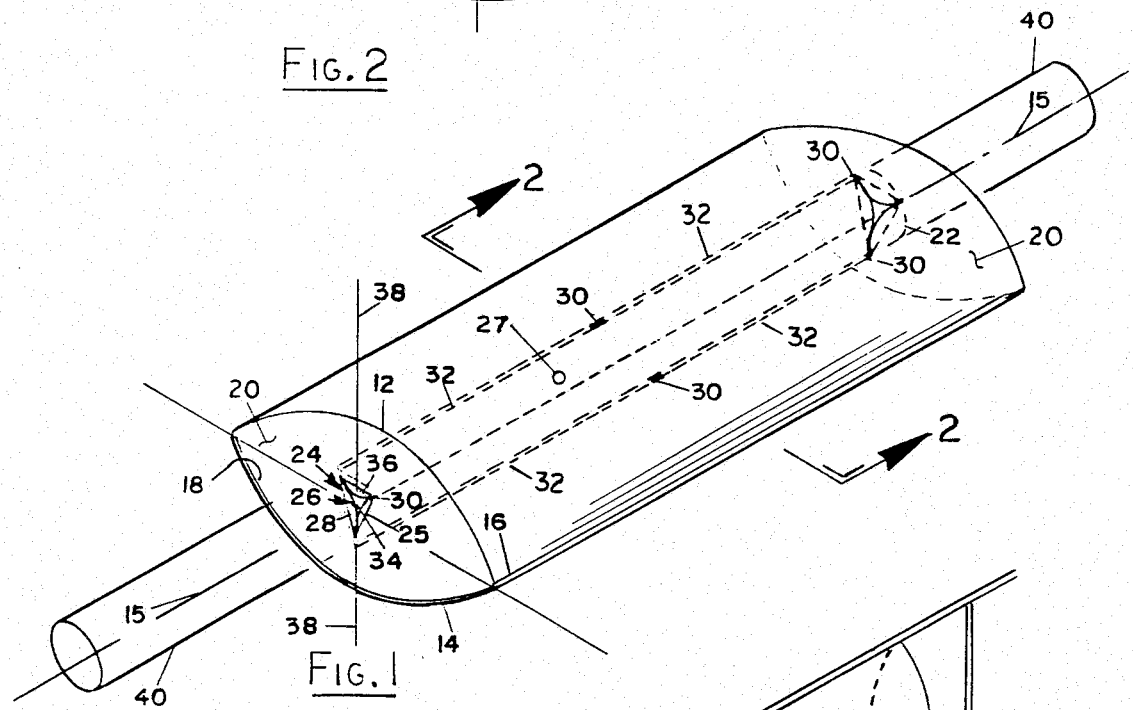
FIG. 1 is a perspective view of the solar collector constructed according to the teaching of the present invention.

Referring now to FIG. 1, the solar collector is formed of a housing generally depicted by the numeral 10, comprising a pair of elongated curved (generally arcuate and preferably parabolic in cross-section) panels 12 and 14 joined, air-tight, along their longitudinal edges 16 by elongated angular supports 17.

The front panel 12 may be of a clear plastic or glass that is transparent to allow the sun's rays to readily pass therethrough. The rear panel 14 also may be of the same material as the front 12 but has its inner surface 18 highly reflective to cause the sun's rays to be reflected directed inwardly to a line of focus no matter at which angle the sun's rays intersect the surface. The front and rear panels 12 and 14 are closed by identical end walls 20 of any suitable, but preferably transparent material which are also sealed to the panels 12 and 14 against fluid as air leakage along their peripheral edges. A hollow, fluid-tight enclosed housing 10, symmetrical along the longitudinal central axis 15 is thus provided.

Each of the end walls 20 is provided with axially aligned openings 22 that are centered substantially about and along the central axis 15. The openings 22 are shown to be substantially circular in cross-section. As the description proceeds it will be clear that the same may be of any other desired configuration or shape. Bridging the opening 22 and spanning the distance between the longitudinally spaced end walls 20 is a continuous equilateral triangular inner support tube, generally depicted by the numeral 24. The walls 25 are secured together at their apices or longitudinal edges throughout their lengths. The inner triangular tube 24 is mounted within the housing 10 between the circular openings 22 of fluid-tightly securing the ends of the tube 24 to each of the end walls 20. The openings 22 in each of the side walls is no larger than the cross-section of the tube 24 although preferably it is of the same cross-section. However, the same may be of even smaller cross-section than the tube 24.

Preferably, the parts so far described, i.e., the front and rear panels 12 and 14, the side walls 20, and triangular inner tube 24 are all formed of transparent sheet, molded or extruded plastic appropriately shaped so that the joining edges and contact points can be easily and inexpensively heat welded, sealed or glued, or secured to each other. The reflective inner surface 18 can be applied by spray or vacuum coating a layer of mirroring material thereon or, if desired, by securing a sheet of foil, aluminum, or other mirroring material on either the inner or outer face of the rear panel 14. It is preferred that the reflective surface be located on the inner face of the rear panel 14 to minimize soiling or possible damage thereto during use.

The lenticular cross-section of the housing 10 creates a self-supporting and rigid structure, requiring little support during use. Further, the cover or front wall or panel 12 prevents debris, leaves, etc. from entering the collector, and it can be easily wiped clean of gathering dirt or dust. The whole outer housing 10 provides an essentially fluid-tight enclosure in which heat produced by the penetrating sun's rays is trapped. To insure that the housing does not expand or deform as a result of the heat trapped therein, one or more small holes 27 are provided in one or more of the walls 25 of the triangular tube 24. This allows the heated air from the housing to circulate into the triangular tube 24.

Removably located within the inner triangular support tube 24 is an inner heat exchanger and absorber generally identified by the numeral 26 of substantially tri-cusped hypocycloid configuration. The inner absorber 26 is formed of three curved elongated, general rigid, so as to be self-supporting, but bendable sheets 28 of high heat absorbent material, such as black plastic, black anodized aluminum or the like. The absorber sheets 28 are joined together along their lengths by a plurality of clips 30 relatively spaced from each along the edges of the absorber sheets 28. The clips 30 also serve to secure and insulate the absorber 26 and its sheets 28 to the triangular support tube 24 within which they are supported by frictional connection along the lengths of the edgewise intersections of the side walls 25 of the triangular tube 24.

The absorber sheets 28 are wider than the triangular sides 25 of the tube 24. Hence, when their edges are secured together by the clips 30 a portion of the widths of the inner surfaces of adjacent sheets 28 are pressed together into touching contact, and held in such contact by the clips. Being bendable, the sheets 28 distort into a curve from their edges inward. This produces the hypocycloid shape of the secured sheets 28. The hypocycloid absorber 26 is such that its circumscribing circle is somewhat smaller than the circle circumscribed about the corners of the triangular tube 24 so that longitudinal edges of the securely clipped sheets 28 of the absorber 26 are spaced from the apexes of the triangular tube by the amount of the clips 30. Thus, the clips 30 effect and thereby provide a plurality of longitudinally spaced gaps 32 between the apices of the triangular tube and the lengthwise edges of the hypocycloid sheets 28 of the absorber 26. The gaps or spaces 32 permit circulation of fluid circumferentially around and between the several cusps.

The clips 30, which join the individual sheets 28 of the absorber 26 together, are preferably made of plastic or elastomeric material in pad form so as to provide sufficient friction to secure the sheets 28 together and also to frictionally engage in the apices and with adjacent walls 25 of the triangular tube 24 so as to inhibit undesired relative movement therebetween when once the absorber 26 is positioned therein. The clips 30 hold the sheets 28 frictionally so as to permit each individual sheet to be separately removed from and as a side of the absorber 26 by sliding the sheet axially out of its clips 30. Similarly, the clips 30 hold the entire hypocycloid absorber assembly 26, by friction in the triangular tube 24, so that the whole such assembly may be slidably removed from the tube 24. Because of the overall symmetry of the collector, removal of the hypocycloid absorber 26, or the individual sheets 28, may be made from either end 20 of the housing 10. Preferably the clips are formed of Teflon since such material also has high insulating properties.

When the sheet sides 28 of the absorber 26 are secured and assembled together at their edges by the spaced clips 30, the whole is capable of being manipulated as a unitary assembly. Thus, during assembly of the solar collector, the absorber 26 is inserted through an end of the tube 24 by reducing the circumferential size or diameter of the circle about the apices of the clipped-together sheets 28 to slightly less than the circumference of a circle drawn through the apices of the tube 24.

This compression of the sides 28 causes them to bend and curve inward in a concave manner toward each other so that the extent of contact and touching engagement at their inner surfaces increases with a corresponding decrease in the diameter and circumference of the sides 28. This also produces or effects a corresponding reduction in the cross-section of the central passageway 34 formed by the converging concave sides 28. Hence, when the compressed sides of the absorber 26 are small enough in circumference to fit within the opening of the inner triangular tube 24, the same is slid longitudinally thereinto to assume the location as shown in FIG. 1.

When positioned within the tube 24, the clips 30 frictionally engage in the apices and with the adjacent sides 25 of the tube that form each apex. This prevents accidental or unwanted relative movement between the absorber 26 and the tube 24, but also permits their relative disassembly if required at a later time. While adjacent sides 28 are retained in their extensive inner surface-to-surface engagement by their compressed support within the tube 24, their outer concave surfaces form chordal segments 36 with the facing walls 25 of the tube 24. As a consequence, both the inner central passageway 34 and the chordal segments 36 form distinct inner and outer fluid passageways within the inner tube 24.

Each of the chordal segments 36 has one of the tube walls 25 forming one of its sides, while the longitudinal edges of adjacent sheets 28 are held securely together by clips 30. The thickness of each clip 30 is sufficient to relatively space the adjacent edges of the secured sheets from the corner or apex of the adjacent walls 25 so as to provide for a fluid gap or fluid flow passageway 32 therebetween. As a result, each of the longitudinal edges of the sheets 26 positioned within each respective corner of the tube 24 at the apex formed between adjacent walls 25 thereof is in fluid flow communication with the other chordal segments 36 to enable the free flow of fluid circumferentially about the absorber 26.

At the same time, however, the longitudinally extending walls 25 of the tube 24 are closed along their lengths to form a closed tube that entraps within it whatever fluid is flowing therethrough. Thus, whatever heat that is contained within the fluid flowing in the central passageway 34 is also trapped therein since it can flow only lengthwise along the passageway between the open ends thereof. On the other hand, the fluid medium in the chordal segments 36 can flow lengthwise from end to end of the absorber and also circumferentially about the outer surfaces of the sheets 28 by way of the gaps 32. This circumferential flow permits an exchange of temperature which assures that each segment 36 will be substantially equal in temperature and that none of such segments will be substantially greater in temperature than any other segment.

This circumferential type of flow segment to segment 36 permits an even exchange of heat and temperatures so that all of the segments will achieve substantially the same temperature even though one of the segments may not be subject to the direct rays of the heat of the sun. The whole of the aforedescribed structure is enclosed within the further heat entrapping container afforded by the closed housing 10 within which the same are housed. The result is that whatever heat is acquired by the fluid medium in the housing 10 adds to and functions as a heat exchanger to increase the heat within the medium of the tube 24. In like manner, the heat of the fluid medium in the segment 36 adds to and exchanges heat with the heat of the fluid medium flowing in the passageway 34.

Preferably, the triangular support tube 24, and hypocycloid absorber 26 are arranged so that one of the apexes lies in a plane 38 coincident with the transverse cross-sectional diameter of the housing, so that one flat side wall 25 of the triangular tube 24 and one concave side of the core absorber 26 is most open, facing and exposed to all of the sun's rays. This arrangement, however, may be varied as described. It will be observed that the transparent triangular support tube 24 defines with the housing 10, a generally annular chamber in which heat collects. As a result of the use of a transparent housing panel 12 and walls 25 of the support tube 24, the energy of the sun is easily incident on the absorbing sheets 28 of the core. The relatively thin black sheets 28 readily absorb and conduct the sun's heat to the fluid medium flowing through the core passage 34. The large area of touching engagement between the sheets effects a very rapid even exchange of heat between them and the medium in the segments or chambers 36, while the whole is doubly insulated and caused to retain its acquired heat by the enclosing tube 24 and housing 10.

The whole solar collector is easily connected into a solar heating system, by securing a duct 40 to each of the end walls 20 about the respective openings 22. One end duct 40 may be connected to a blower and the other end duct 40 may lead and be connected to a user, such as an interior house radiator or the like. The collector 10 may be conveniently mounted on a roof or in an open field or the like in any conventional manner and by known mounting means such as a gimbal support that allows it to be tilted for the best position in the path of the sun.

Figure 3:
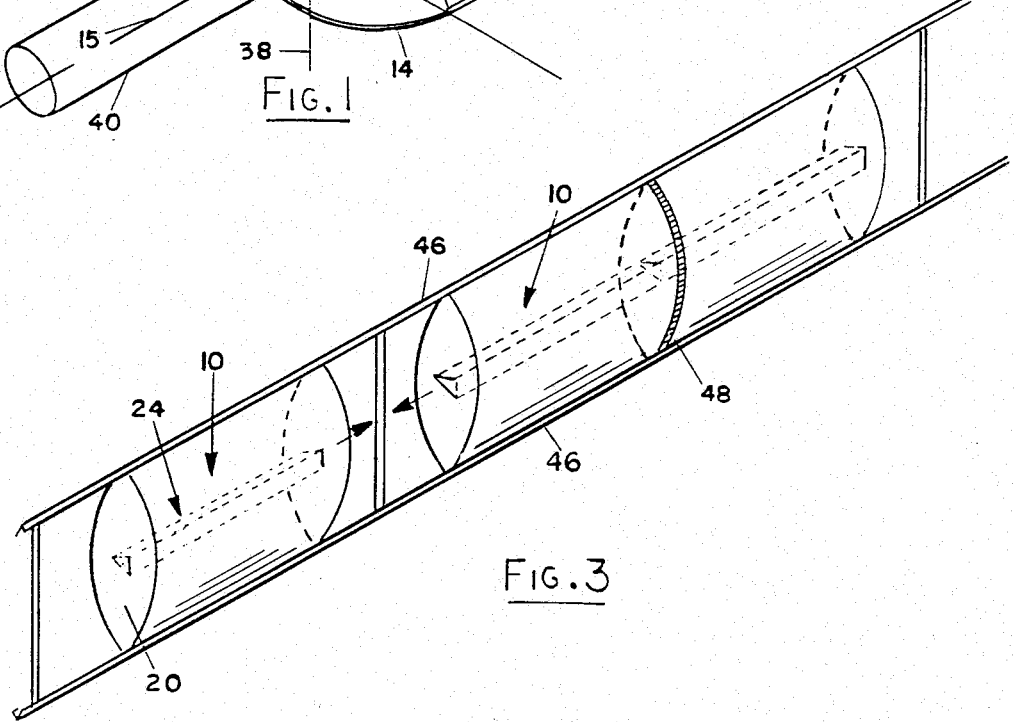
FIG. 3 is a perspective view of an assembly of several collectors in a heating system.

The present collector is easily ganged, in series, in any desired multiples as seen in FIG. 3 with the same or similar constructed collectors 10, merely by abutting the ends of two collectors and/or providing a simple short fitting or fluid seal between the outlet opening 22 of one and the like inlet opening 22 of the abutting collector. The ganged collector 10 can be easily mounted between a pair of V-shaped channels 46 which enables the collectors to be slid easily into abutment. Suitable seals or gaskets 48 can be placed between abutting collectors to seal them fluid-tight.

Of course, while the polygonal shapes of the central core absorber 26, and its surrounding tube 24 are shown as a hypocycloid and triangle respectively, the same can be varied so that other geometric shapes can be employed. For example, the triangular 24 may be squared, and a modified four cusped hypocycloid employed using four sheets curved in cross-section may be mounted therein. In like manner, the end opening 22 may also be squared to suit.

While the collector of the present invention may be characterized as a polygon within a polygon, the cross-sectional shapes of each of the coaxially aligned structures 10, 24 and 26 are different; therefore, each of the heating areas formed in them is different. This results from the fact that the coaxially aligned support tube 24 and absorber tube 26 are polygons of different shapes. As a result, the flow of heat is promoted under different radian conditions. Reflection from the respective surfaces is significantly reduced since there are no two surfaces which are parallel. The flat surfaces of the inner triangular tube 26 reflect little light as the sun's rays become more tangent and allow a larger surface area to capture more of the focus of the sun as the sun moves during seasonal pitch and daily east-west traverses without shading the reflector surface than would a circular tube of the same diameter.

The inner volumetric space of the triangular tube 24 allows the heat exchange medium to flow both on the inside, as well as about the outside of the absorption tube 26 surfaces as described. This creates twice as much surface area for rapid heat exchange, as well as carrying off the heat that is also generated on the outside of the absorption tube 26 that would be lost to what would otherwise be the dead air space zones about the triangular tube.

The air gaps 32 extending along the lengths of the absorber triangular tubes 26 and 24 allow for circulation of air between the chambers 36 so that the temperature gradiants between these chambers 36 is held to a minimum no matter in what position the collector is placed relative to the sun. Maintenance of the absorber tube 26 spaced from the triangular tube, i.e., by use of the clips 30, provides a further advantage in that the inner absorber tube will not readily lose heat, by conduction to the walls 25 of the triangular tube, but will retain such heat for conductive transference to the fluid media passing through its center 34.

The ability to easily remove the absorption tube 26 from its outer enclosing tube 24 permits the collector to be shut down during the hotter summer months when heat is not required. By simply withdrawing some or all of the black absorption sheets 28, depending on heat requirements, one can adjust or eliminate totally hazardous heat build-up during the hotter parts of the year. Removing the core absorber 26 allows the housing 10 to be left in place during the summer months, the sun's rays being merely reflected into the atmosphere. This significantly reduces the cost of reinstallation and reconstruction.

Although it should be apparent to those skilled in the ar that any fluid media may be used in the present invention, it has been found in practice that air is the easiest and most readily available. Thus, in practice, the incoming air may be pumped by a blower to the inner triangular tube 24 by way of the duct 40 connected with the opening 22. The air flow may be further increased by the addition of a suction type blower mounted in the duct downstream of the tube 24. A liquid media may also be used by providing for a fluid-tight connection between the end wall openings 22 and the ducts 40 connected therewith.

Various modifications, changes and variations in the preferred embodiment have been described. Other such modifications, etc., will be obvious to those skilled in this art. Accordingly, the foregoing specification is to be taken as illustrative only and not limited of the present invention.

As used herein, the term polygon or its derivatives is intended to mean a closed plane figure bonded by three or more sides or segments.

What I claim is:

1. Apparatus for the collection of solar heat energy and its transference to a fluid media to be heated comprising an elongated housing having a transparent front panel, an arcuate rear panel and a pair of opposed side walls, said rear panel having a reflecting surface directing the solar energy along an elongated line of focus,
    an elongated heat collector extending substantially along the line of focus between said side walls,
    said heat collector comprising a hollow elongated transparent tubular support and an inner tubular heat exchanger formed of a plurality of curved elongated absorbent sheets in surface engagement along their edges with adjacent sheets to provide outwardly extending elongated projections,
    and means for releasably retaining said sheets in surface engagement with the elongated projections thereof spaced in and from said tubular support to define a plurality of heat chambers therebetween, said means spacing each of the projections out of contact with said tubular support to define gaps therebetween for the free circulation and flow of the fluid media between said tubular support chambers, and duct means extending through said side walls respectively for communication with each end of said heat collector for the passage therethrough of a fluid media to be heated.

2. The apparatus according to claim 1 wherein said tubular support is of triangular cross-section formed of a plurality of sides connected at the corners of the triangle, and said tubular heat exchanger being formed of three sheets engaged along their elongated edges the projections of which extend toward the corners of the connected sides of said tubular support.

3. The apparatus according to claim 2 wherein said heat absorbent sheets are individually removable from said tubular support.

4. The apparatus according to claim 2 wherein said means for releasably retaining heat absorbent engaged sheets insulate said heat exchanger and heat collector from contact with each other.

5. A solar heating system comprising a plurality of collectors, each collector comprising an oblong housing having at least one pair of opposed side walls and a heat absorbing core arranged therebetween, said heat absorbing core having a transparent outer tubular support of polygonal cross-section mounted in fluid-tight arrangement at each end to the respective side walls of said housing, and an inner heat absorber having an axial passageway and removably mounted with said outer tubular support, said heat absorber having a polygonal cross-section other than that of said outer tubular support to form a plurality of elongated chambers therebetween, each of the opposed side walls of said housing having a hole formed therein in registry with the axial passageway of said inner heat absorber, each said hole being sufficiently large in cross-section to permit removal of said inner heat absorber from said outer tubular support, said collectors being serially arranged with their side walls in abutment and their adjacent holes in registry with each other whereby the axial passageway of the inner heat absorber of one collector is connected with the axial passageway of the inner heat absorber of the adjacent collector.

6. The system according to claim 5 wherein the housing of each collector is elliptical in cross-section and is provided with a pair of longitudinal edges and said system includes a pair of V-shaped mounting rails opposed to each other into which said elliptical housing is slidably received, said longitudinal edges entering into said V-shaped rails.

7. The system according to claim 6 including seal means interposed between abutting collectors to maintain said registry holes fluid-tight.

8. A heat collector for a solar heating device comprising a transparent elongated outer tubular support having a polygonal cross-section and an elongated inner tubular heat absorber;
    said heat absorber having a polygonal cross-section different from that of said outer tubular support and a central axial passageway for the passage of a fluid media to be heated, each side of said absorber being concave to define a chamber with a side of the outer tubular support;
    and means between said outer tubular support and said heat absorber for mounting said absorber within said outer tubular support to space said heat absorber from said tubular support to form said chambers in circumferential communication between said outer tubular support and heat absorber for the circumferential communicating flow of a fluid between said chambers.

9. The apparatus according to claim 1 wherein said outer tubular support is triangular in cross-section.

10. The apparatus according to claim 1 or 9 wherein said heat absorber is shaped as a tri-cusped hypocycloid.

11. The apparatus according to claim 10 wherein said heat absorber is formed of three elongated sheets abutting along their adjacent edges, and mounting means for releasably holding together the elongated abutting edges of adjacent ones of said sheets in heat exchanging contact.

12. The apparatus according to claim 11 wherein said means for holding together the sheet abutting edges comprises an insulating clip in which said abutting edges are frictionally held together and are spaced and insulated from contact with said outer tubular support.

13. The apparatus according to claim 11 wherein said clips frictionally engage the tubular support for releasably mounting said heat absorber within said tubular support to provide said spaces therebetween for the communicating flow of fluid between said chambers and permit relative movement between said tubular support and heat absorber for removal of said heat absorber from within said tubular support.

14. In a solar collector, an elongated heat absorbing and exchange assembly comprising an outer substantially triangular tube and a plurality of curved individual elongated heat absorbing sheets arranged adjacent to each other in cross-section in a polygon to form an elongated central conduit through which a heated fluid medium flows within and for the length of said outer triangular tube and defining with said outer triangular tube a plurality of heat exchange chambers about said central conduit, said individual sheets each being slidably removable from said outer triangular tube to deactivate said heat absorbing and exchange assembly and being slidably insertable thereinto to reactivate said heat absorbing and exchange assembly, and means securing said sheets relatively spaced from said outer triangular tube to insulate and space said sheets and tube from each other to enable a circumferential flow of fluid between said chambers.

15. In a solar collector as in claim 14, said heat absorbing and exchange assembly being enclosed by a housing, said housing comprising an arcuate reflecting panel and a transparent cover each connected together substantially flud-tight along their lengths, and side walls closing the opposite sides of said housing and each side wall having an opening defined therein to provide access to said heat absorbing and exchange assembly.

16. In a solar collector as in claim 15, said access openings in said side walls communicating fluid media to said central conduit and said plurality of heat exchange chambers and enabling slidable insertion and removal and heat absorbing sheets into and from said housing.

17. In a solar collector as in claim 14, said securing means releasably securing said sheets together and defining said space between said sheets and outer triangular tube to provide communicating fluid passageways between said plurality of heat exchange chambers for the flow of fluid therebetween to equalize the temperatures therein.

* * * * *

UNITED STATES PATENT AND TRADEMARK OFFICE
CERTIFICATE OF CORRECTION

PATENT NO. : 4,515,149

DATED : May 7, 1985

INVENTOR(S) : Sgroi, et al.

It is certified that error appears in the above-identified patent and that said Letters Patent is hereby corrected as shown below:

Claim 9, line 1:  delete "claim 1" and replace with --claim 8--;

Claim 10, line 1: delete "claim 1 or 9" and replace with --claim 8 or 9--.

Signed and Sealed this

Twenty-ninth Day of December, 1987

*Attest:*

DONALD J. QUIGG

*Attesting Officer*      *Commissioner of Patents and Trademarks*